United States Patent [19]
Narita

[11] Patent Number: 5,784,176
[45] Date of Patent: Jul. 21, 1998

[54] METHOD OF IMAGE NOISE REDUCTION PROCESSING

[75] Inventor: Toshihiko Narita, Kanagawa, Japan

[73] Assignee: Fuji Photo Film Co., Ltd., Kanagawa, Japan

[21] Appl. No.: 582,918

[22] Filed: Jan. 4, 1996

[30] Foreign Application Priority Data

Jan. 17, 1995 [JP] Japan .................. 7-004842

[51] Int. Cl.$^6$ .................................. H04N 1/38
[52] U.S. Cl. .................. 358/463; 396/213; 396/242
[58] Field of Search ................. 358/463, 464, 358/462, 443, 447, 453, 454, 465, 467, 475; 382/274, 270, 272, 275, 165; 396/89, 98, 121, 168, 213, 237, 255, 242; H04N 1/38

[56] References Cited

U.S. PATENT DOCUMENTS

| | | |
|---|---|---|
| 4,649,436 | 3/1987 | Nakagawa .................. 358/280 |
| 4,688,099 | 8/1987 | Funston .................. 358/214 |
| 4,827,526 | 5/1989 | Matsumoto .................. 382/1 |
| 5,223,892 | 6/1993 | Ikenoue et al. .................. 355/77 |
| 5,463,470 | 10/1995 | Terashita et al. .................. 358/520 |
| 5,497,431 | 3/1996 | Nakamura .................. 358/520 |

*Primary Examiner*—Edward L. Coles, Sr.
*Assistant Examiner*—Madeleine Av Nguyen
*Attorney, Agent, or Firm*—Sughrue, Mion, Zinn, Macpeak & Seas, PLLC

[57] ABSTRACT

A method of noise reduction processing for reducing noise generated when an image of a photographic film is converted to a digital image signal includes the steps of: measuring a large area transmission density of each of a plurality of image frames recorded on the photographic film; classifying measured values of the large area transmission density into a plurality of groups; reading the image signals of the same image frame by an amount corresponding to the number of inputs of the image signals of the same image frame set in advance for each of the classified groups; and subjecting the image signals of the same image frame which have been read to averaging processing.

21 Claims, 2 Drawing Sheets

METHOD OF IMAGE NOISE REDUCTION PROCESSING

BACKGROUND OF THE INVENTION

1. Field of the Invention

The present invention relates to a method of image noise reduction processing, and more particularly to a method of image noise reduction processing when an image on a photographic film is used as an image signal.

2. Description of the Related Art

In a mini-lab (a system for processing photographic films in small volumes at a photofinihing laboratory or the like) which is capable of printing photographs speedily and simply, after printed results are estimated on the basis of the densities of the negative, the negative is imaged by a TV camera, and desired processing is carried out with respect to the image data. It is known that in the case where an image thus obtained by the TV camera is fetched from a scanner and is utilized, if the negative density is high, the quantity of light from a light source is insufficient, resulting in a decline in the signal level.

It is conceivable to electrically amplify the signal level in order to compensate for the decline in the signal level, but there arises a drawback in that the signal-to-noise (S/N) ratio deteriorates due to the electrical amplification, so that the noise in the image becomes noticeable. In cases where the image is reduced and is displayed by a smaller number of pixels as in an index print, in particular, the noise becomes conspicuously noticeable in the displayed image.

Accordingly, in such a case, the noise reduction processing is carried out uniformly with respect to all the image signals by estimating in advance the execution of fixed noise reduction processing, or by determining as to whether or not the noise reduction processing is to be effected for the obtained image signals.

However, with the mini-lab for which speedy processing is required, the provision of the noise reduction processing results in a longer processing time, which produces an undesirable result in that the processing speed of the system declines.

SUMMARY OF THE INVENTION

The present invention has been devised in view of the above-described circumstances, and its object is to provide a method of image noise reduction processing in which the processing speed does not decline more than is necessary even if necessary image noise reduction processing is carried out.

To this end, in accordance with a first aspect of the present invention, there is provided a method of noise reduction processing for reducing noise generated when an image of a photographic film is converted to a digital image signal, comprising the steps of: measuring a large area transmission density of each of a plurality of image frames recorded on the photographic film; classifying measured values of the large area transmission density into a plurality of groups; reading the image signals of the same image frame by an amount corresponding to the number of inputs of the image signals of the same image frame set in advance for each of the classified groups; and subjecting the image signals of the same image frame which have been read to averaging processing.

In accordance with a second aspect of the present invention, there is provided a method of noise reduction processing for reducing noise generated when an image of a photographic film is converted to a digital image signal, comprising the steps of: measuring a large area transmission density of each of a plurality of image frames recorded on the photographic film; classifying measured values of the large area transmission density into a plurality of groups; determining the number of inputs of image signals of the same image frame for each of the classified groups; reading the image signals of the same image frame by an amount corresponding to the determined number of inputs; and subjecting the image signals of the same image frame which have been read to averaging processing.

In accordance with a third aspect of the present invention, there is provided a method of noise reduction processing for reducing noise generated when an image of a photographic film is converted to a digital image signal, comprising the steps of: measuring a large area transmission density of each of a plurality of image frames recorded on the photographic film; classifying measured values of the large area transmission density into a plurality of groups each having a predetermined range of measured values of the large area transmission density; reading the image signals of the same image frame by an amount corresponding to the number of inputs of the image signals of the same image frame set in advance for each of the classified groups; and subjecting the image signals of the same image frame which have been read to averaging processing by adding the image signals of the same image frame which have been read and then by dividing data on the added image signals by the number of inputs of the image signals of the image frame which have been read.

In accordance with a fourth aspect of the present invention, in the first, second, and third aspects of the present invention, the method of noise reduction processing is used in the preparation of an index print for use as an index of the plurality of image frames recorded on the photographic film.

In accordance with the first, second, and third aspects of the present invention, the image frames are classified on the basis of the measured values of the large area transmission density of the photographic film. For example, the image frames are classified as group A in a case where the measured value of the large area transmission density of the image is normal or underexposed, as group B in a case where the measured value is lightly overexposed, and as group C in a case where the measured value is excessively overexposed (i.e., super-overexposed). It should be noted that an image which tends to have been underexposed can be processed as a normally recorded image by increasing the amount of exposure. The number of inputs of image signals of the same image frame is determined or set in advance according to this classification. As a result, the noise reduction processing is not executed for the group A, while in the case of the groups B and C the number of inputs of image signals of the same image frame is set according to the measured values of the large area transmittance density. Hence, it is possible to effect processing speedily without causing a decline in the processing speed more than is necessary.

In accordance with the fourth aspect of the present invention, since the method of noise reduction processing is used in the preparation of an index print for use as an index of the plurality of image frames, the noise in a reduced frame can be reduced speedily and effectively without causing a decline in the processing speed more than is necessary. Accordingly, it is possible to provide an index print in which the images in the respective frames are clear.

The above and other objects, features and advantages of the present invention will become more apparent from the following detailed description of the invention when read in conjunction with the accompanying drawings.

DESCRIPTION OF THE PREFERRED EMBODIMENT

Figure 1:
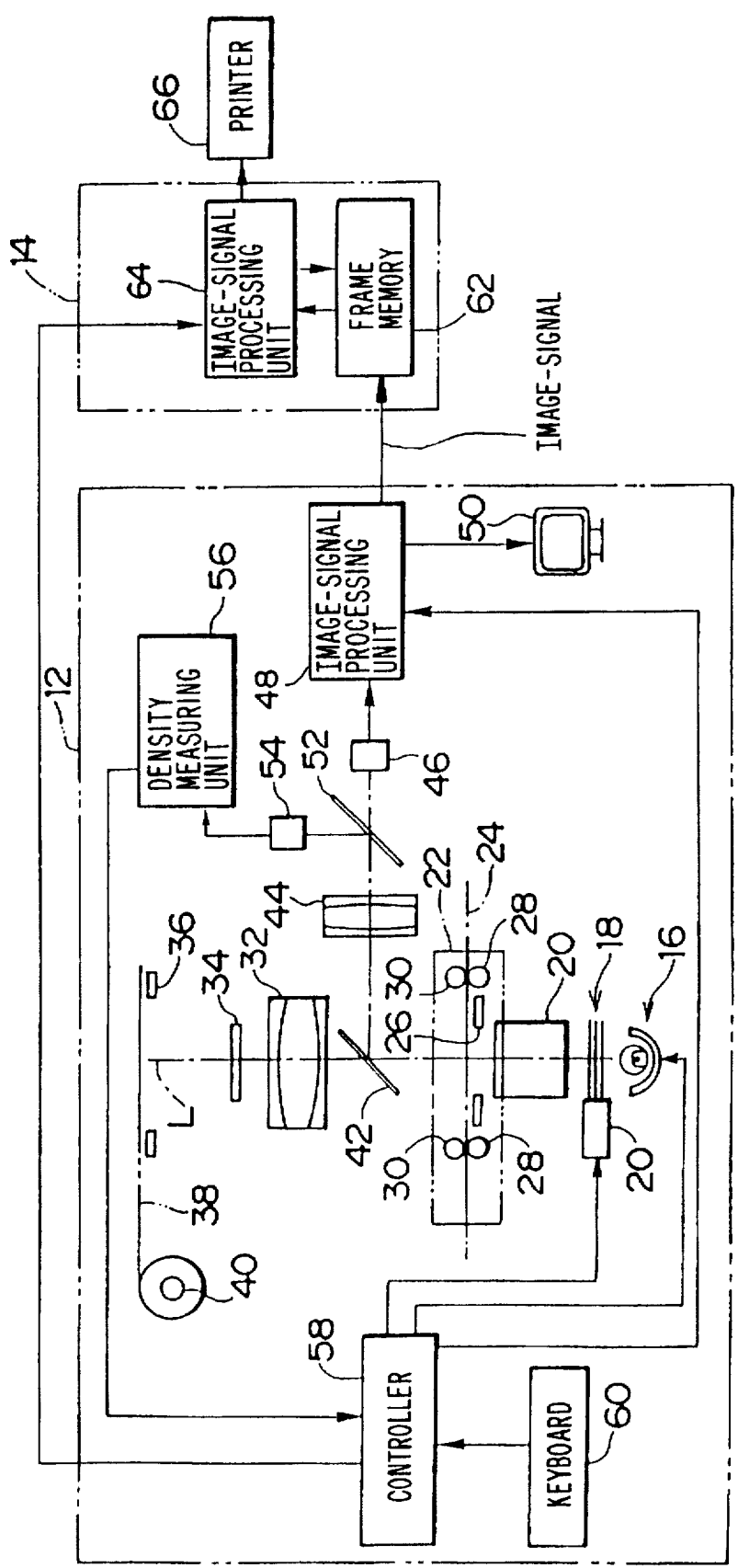
FIG. 1 is a diagram illustrating a photographic processing apparatus using the method of noise reduction processing in accordance with an embodiment of the present invention.

Referring now to the accompanying drawings, a detailed description will be given of an embodiment of the present invention. FIG. 1 shows a photographic processing apparatus 10 to which the present invention is applied. The photographic processing apparatus 10 is comprised of a printing/processing section 12 and an image utilizing section 14.

The printing/processing section 12 has a light source 16 constituted by a halogen lamp and a reflector. Cut-off filters 18 for the respective colors, i.e., cyan (C), magenta (M), and yellow (Y), are arranged in the printing optical path L of rays of light emitted from the light source 16. These cut-off filters 18 are inserted into or moved away from the optical path L in response to signals from a driver 19.

A light diffusing cylinder 20 is disposed in the printing optical path L above the cut-off filters 18 (i.e., on the downstream side of the optical path L), and a negative carrier 22 is disposed in the optical path downstream of the light diffusing cylinder 20. The negative carrier 22 is so arranged as to position an elongated negative film 24 in place by means of a negative mask 26 and to transport the negative film 24 in the longitudinal direction thereof by nipping the negative film 24 by transport rollers 28 and press rollers 30.

A printing lens 32 is provided in the printing optical path L above the negative carrier 22, and a black shutter 34 is disposed in the optical path downstream of the printing lens 32. The black shutter 34 is opened and closed in response to a drive signal from an unillustrated driver so as to transmit or shut off the light in the printing optical path L.

The lens 32 is movable along the optical path L, so that the enlargement magnification can be altered by moving the lens 32.

A print mask 36 is disposed above the black shutter 34 and at an uppermost position in the printing optical path L (i.e., in the vicinity of the image plane) so as to fix in a predetermined printing position a portion of a roll-shaped photographic printing paper 38 which has been taken up around a rotating shaft 40 in roll form and a leading end of which has been drawn out from its outer periphery.

A half mirror 42 is disposed in the optical path between the negative carrier 22 and the printing lens 32 so as to transmit and reflect the image transmitted through the negative film 24. The transmitted image which has been reflected is then transmitted through a lens 44 and a half mirror 52 which will be described later. An image of the transmitted image is then formed by a CCD image sensor 46, and signals thereof are supplied to an image-signal processing unit 48. A monitor 50 is connected to the image-signal processing unit 48 to display an image in which the image signals have been converted to electrical signals (i.e., digital signals) by the image-signal processing unit 48 and have been subjected to various processing.

The half mirror 52 is disposed between the lens 44 and the CCD image sensor 46 so as to apply to a density measuring device 54 the transmitted image of the negative film 24 which has been reflected by the half mirror 52. A density measuring unit 56 is connected to the density measuring device 54 so as to measure the large area transmittance density (LATD) of the transmitted image of the negative film by means of the density measuring device 54. The density measuring unit 56 is connected to a controller 58 which sets exposure correction values at the time of exposure on the basis of measured values from the density measuring unit 56 or data inputted from a keyboard 60 by an operator.

In addition, the controller 58 is connected to the light source 16 and the driver 19. The controller 58 is also connected to the image-signal processing unit 48. The image-signal processing unit 48 effects various image processing in response to signals from the controller 58. The image displayed on the monitor 50 is adapted to correspond to the image which is actually printed on the photographic printing paper 38, and the operator is capable of performing the image processing operation while viewing the monitor 50.

The image-signal processing unit 48 of the printing/processing section 12 is connected to the image utilizing section 14 of such as a personal computer. The image utilizing section 14 is comprised of a frame memory 62 and an image-signal processing unit 64. The frame memory 62 is connected to the image-signal processing unit 48 so as to store the image signals of the transmitted image of the negative film 24 which have been subjected to A/D conversion by the image-signal processing unit 48. The frame memory 62 is also connected to the image-signal processing unit 64 to output the stored image signals to the image-signal processing unit 64.

The image-signal processing unit 64 is connected to the controller 58, and the large area transmittance density values measured by the density measuring unit via the density measuring device 54 are inputted to the image-signal processing unit 64 via the controller 58. On the basis of the measured values of the large area transmittance density inputted to the image-signal processing unit 64, the image-signal processing unit 64 gives a predetermined instruction to the frame memory 62 and effects noise reduction processing with respect to the image signals stored in the frame memory 62.

The noise reduction processing (i.e., averaging processing) is processing in which randomly existing noise is reduced by adding the image signals n times and then by dividing data on the added image signals by n. The greater the n, the more noticeable is the noise reduction, but an increase in the processing time can result. Therefore, the large area transmittance density values which are measured for each image are used directly, and the n is set in correspondence with these measured values of the large area transmittance density. Namely, in a case where the measured values of the large area transmittance density of the negative film 24 are high (i.e., overexposed) (this case will be referred to as group B), noise reduction processing is required, so that the addition by about five times, for instance, is preferable. However, in a case where the measured values of the large area transmittance density of the negative are very high (i.e., super-overexposed) (this case will be referred to as group C), the signal-to-noise (S/N) ratio is substantially deteriorated, so that sufficient noise reduction processing is required. Hence, sufficient noise reduction processing is carried out by setting the value of n to a large value of, for example, 30 to 40 or thereabouts. On the other hand, in a case where the measured values of the large area transmittance density of the negative are low (i.e., underexposed) (this case will be referred to as group A), the amount of noise which can be reduced by the noise reduction processing is small, so that the noise reduction processing is not carried out.

A printer 66 serving as a means for utilizing the image signals is connected to the image-signal processing unit 64, and the image signals subjected to predetermined noise reduction processing by the image-signal processing unit 64 are outputted as a printed image. In this embodiment, a printer using a liquid crystal display (LCD) is used as the printer 66.

Next, a description will be given of the operation of this embodiment.

In the printing/processing section 12, the respective image frames are consecutively positioned in the negative mask 26 while the negative film 24 inserted into the negative carrier 22 is being nipped and transported by the transport rollers 28 and the press rollers 30. When the image frame of the negative film 24 is positioned in the negative mask 26, the controller 58 operates the light source 16 and the driver 19 on the basis of the large area transmittance density values measured by the density measuring unit 56 by means of the density measuring device 54, and the image on the negative film 24 is displayed on the monitor 50. The operator is capable of proceeding with the image processing operation while viewing the image being displayed on the monitor 50. The photographic printing paper 38 onto which the image subjected to image processing has been printed is transported to an unillustrated processor section so as to be subjected to development processing. The photographic printing paper 38 is then cut for each image frame, and is discharged from the processor section.

Figure 2:
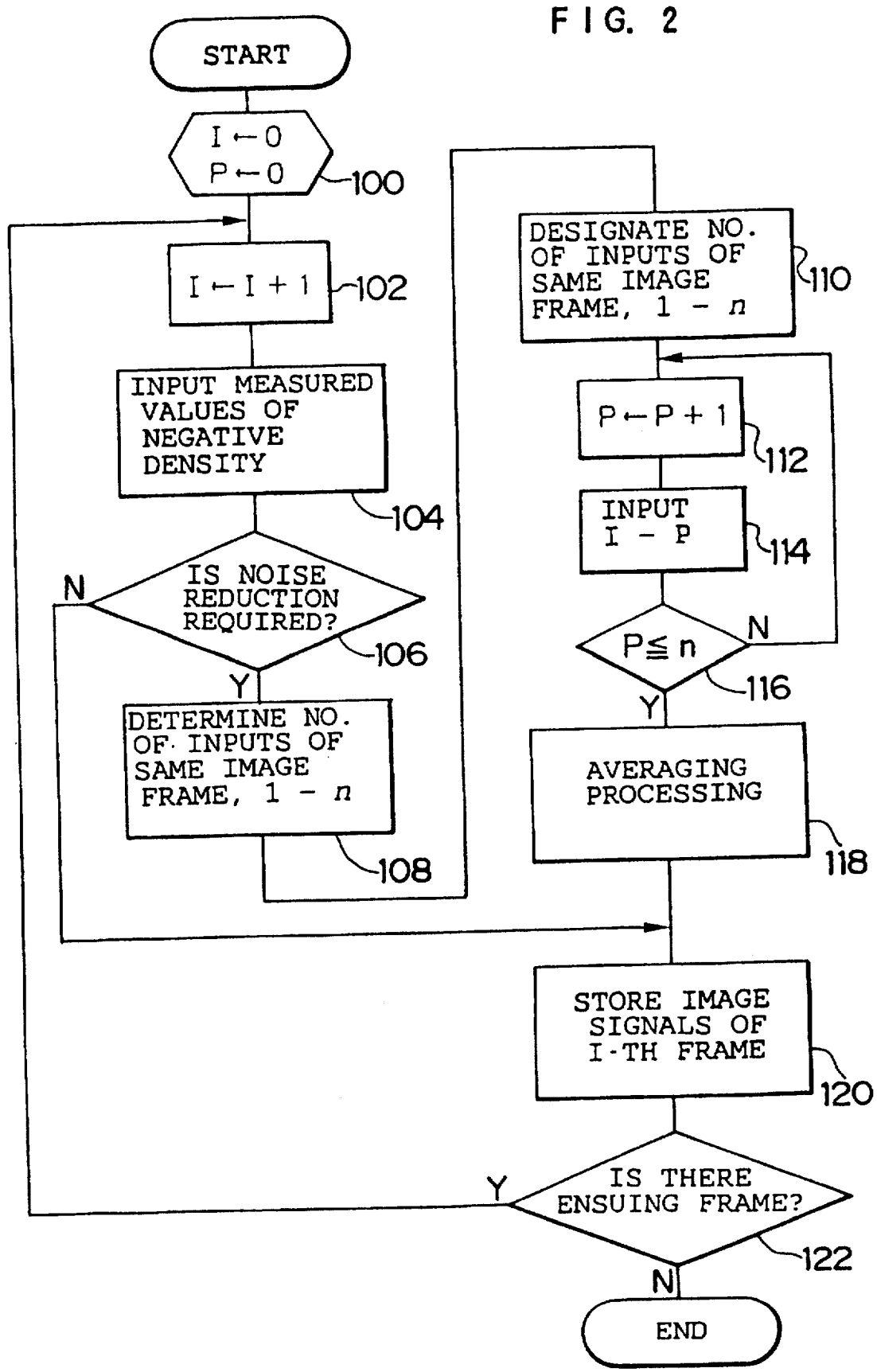
FIG. 2 is a flowchart illustrating the flow of noise reduction processing in accordance with the embodiment of the present invention.

Meanwhile, the image signals of the transmitted image of the negative film are sent to the image utilizing section 14 via the controller 58. After the image signals are then subjected to predetermined noise reduction processing in correspondence with the measured values of the large area transmittance density of the negative, the image signals are outputted to the printer 66. Hereafter, a description will be given of the noise reduction processing in accordance with the present invention with reference to the flowchart shown in FIG. 2.

In Step 100, the initialization of variables I and P is effected as a preliminary step. Here, the frame number in the negative film 24 is designated as I, while the number of input image signals with respect to one frame is designated as P. These variables are used to secure a memory area, which is expressed as "I-P" for each image signal, in the frame memory 62 shown in FIG. 1. For example, if "I-P" is "5-3," it means that the image data is the third image data of the frame number 5.

Next, in Step 102, the frame number I is designated. The frame number is the number of the frame in the negative film 24 to be processed, and is designated as the number of each image subjected to a series of processing.

After the frame number I is designated, in Step 104, the measured values of the large area transmittance density of the negative corresponding to the frame number I and obtained by the measurement of the large area transmittance density of the negative film are inputted. The measurement of the negative film density can be measured by the density measuring unit 56 by means of the density measuring device 54 with respect to the transmitted image of the negative film 24 reflected by the half mirrors 42 and 52, as described above. The measured values of the large area transmittance density thus obtained are inputted to the image-signal processing unit 64 via the controller 58.

After the measured values of the large area transmittance density from the controller 58 are inputted to the image-signal processing unit 64, in Step 106, a determination is made as to the need for noise reduction processing. In the case where the measured values of the large area transmittance density of the negative film 24 are underexposed or appropriate (i.e., in the case of group A), the amplification processing of the image signals is not carried out, so that NO is given as the answer in the determination. If NO is the answer in the determination, in Step 120, the image signals are stored in the image-signal processing unit 64 as the image signals of the I-th frame. On the other hand, in the case where the measured values of the large area transmittance density of the negative film 24 are overexposed (i.e., group B) or super-overexposed (i.e., group C), the measured values of the large area transmittance density of the transmitted image are low, and the amount of light received by the CCD device constituting the density measuring device 54 becomes low, resulting in the deterioration of the S/N ratio. Hence, YES is given as the answer in the determination of the need for the noise reduction processing.

If YES is the answer in the determination of the need for the noise reduction processing, in Step 108, the number of inputs of the same image frame, 1 to n, (i.e., the number of inputs of image signals) which is subjected to A/D conversion and is inputted in correspondence with the given measured values of the large area transmission density of the negative film or for each group. In Step 110, the number of inputs of the image frame, 1 to n, which has been determined in Step 108 is designated. The number of inputs of the image frame is set in advance in the image-signal processing unit 64 in such a manner as to assume different values depending on the measured values of the large area transmittance density of the negative film, and the number of inputs of the image frame becomes large in correspondence with the degree of overexposure. In this embodiment, n is set to 5 in the case of group B, and n is set to 30 in the case of group C.

After the number of inputs of the image frame, n, is designated, P is set in Step 112. Here, P is equivalent to the number of inputs of the same frame image. After P is designated, a memory area is secured as "I-P," and image signals are inputted to the memory area I-P in Step 114. The inputting of the input image frame to the frame memory 62 is repeated until YES is given as the answer in the determination as to whether or not P has exceeded n in the determination in Step 116. The fact that YES is the answer in this determination means that the inputting of the designated number of inputs of the image frame is completed.

If YES is the answer in the determination in Step 116, in Step 118, all the n image signal data inputted to the same I-th memory area are added, and the added image signal data is then divided by n so as to be averaged, thereby executing the noise reduction processing. Here, the term "noise" means unwanted signals which were not originally present in the image of the negative film 24 but which are generated after passage through the CCD image sensor 46 and conversion into the image signals (digital signals). By virtue of the averaging processing which is effected in Step 118, it is possible to reduce noise which has the above-described characteristics and can otherwise occur with respect to all the input images uniformly in a similar manner.

In Step 120, the image signals which have undergone the averaging processing are stored in the frame memory 62 as the image signals of the first frame. The image signals which are stored here are image signals in which noise has been reduced.

After the image signals are stored in Step 120, a determination is made in Step 122 as to whether or not there is an image frame to be inputted next. If YES is the answer, the operation returns to Step 102, and a series of processing operation is repeated for the image signals of the ensuing frame. On the other hand, if NO is the answer in the determination, it means that the inputting of all the image signals is completed with respect to the series of frames in the negative film 24.

The image signals stored in the frame memory 62 are outputted to the image-signal processing unit 64, and are outputted to the printer 66. Accordingly, the image outputted to the printer 66 is an image in which noise has been reduced. In the case where the image is outputted on the LCD as in this embodiment, it is possible to display the image on a limited number of pixels by reducing the noise, so that a clear image can be obtained.

Although, in this embodiment, the LCD which can be made lightweight and compact is used for the printer 66, it is possible to use not only the LCD but also a device which can be used as a usual output unit such as a CRT and a video TV.

In addition, the present invention can also be applied to the preparation of an index print which is used as an index of a plurality of image frames of one photographic film, for example. In this case, the noise reduction processing in accordance with the present invention can be applied without specially altering the arrangement of the above-described embodiment other than the addition to the image-signal processing unit 64 of the processing for rearranging and reducing the image signals inputted thereto. The noise reduction processing corresponding to the measured values of the large area transmission density of the negative for each image, as described above, is carried out with respect to the data of each image inputted to the image-signal processing unit 64. The image signals subjected to noise reduction processing by the image-signal processing unit 64 are outputted from the printer 66 after being rearranged and reduced in such a manner as to form an index print. Accordingly, even if the number of pixels provided for each image decreases due to the reduction, since the noise is reduced, it is possible to provide an index print of clear images.

Furthermore, although, in this embodiment, the negative density information is used as it is as the amount for correcting an exposure of the negative film, a density measuring section may be provided separately insofar as the overall processing speed of the device does not decline appreciably.

As described above, in accordance with the first to third aspects of the present invention, the image frames are classified into groups according to the measured values of the large area transmittance density of the photographic film, and the image signals of the same image frame are read by an amount corresponding to the number of inputs of the image signals of the same image frame according to the measured values of the large area transmittance density, so as to effect noise reduction processing. Therefore, it is possible to effect processing speedily without causing a decline in the processing speed more than is necessary.

In addition, in accordance with the fourth aspect of the present invention, since an index print can be prepared by reducing noise in a reduced frame speedily and effectively without causing a decline in the processing speed more than is necessary. Accordingly, it is possible to provide an index print in which the images in the respective frames are clear.

In addition, since the noise reduction processing can be carried out by using information obtained from an existing function, processing can be carried out speedily without making a special design change.

What is claimed is:

1. A method of noise reduction processing for reducing noise generated when an image of a photographic film is converted to digital image signals, comprising the steps of:

measuring a large area transmission density of each of a plurality of image frames recorded on the photographic film;

using measured values of the large area transmission density to classify each of the image frames into one of a plurality of groups;

reading the digital image signals of the same image frame n times, n being determined by the group into which said same image frame is classified; and when n exceeds one, subjecting the digital image signals of the same image frame which have been read to averaging processing.

2. A method of noise reduction processing according to claim 1, wherein said method of noise reduction processing is used in the preparation of an index print for use as an index of the plurality of image frames recorded on the photographic film.

3. A method of noise reduction processing according to claim 1, wherein the averaging processing is effected by adding the digital image signals of the same image frame which have been read and then by dividing the added digital image signals by n.

4. A method of noise reduction processing according to claim 1, wherein each of the plurality of groups corresponds to a predetermined range of measured values of the large area transmission density.

5. A method of noise reduction processing according to claim 4, wherein the plurality of groups comprise: group A which includes image frames whose measured value of the large area transmission density is low or appropriate, group B which includes image frames whose measured value of the large area transmission density is higher than group A, and group C which includes image frames whose measured value of the large area transmission density is higher than group B.

6. A method of noise reduction processing according to claim 5, wherein n is 5 for image frames classified in group B.

7. A method of noise reduction processing according to claim 5, wherein n is 30 for image frames classified in group C.

8. A method of noise reduction processing for reducing noise generated when an image of a photographic film is converted to a digital image signal, comprising the steps of:

measuring a large area transmission density of each of a plurality of image frames recorded on the photographic film;

using measured values of the large area transmission density to classify each of the image frames into one of a plurality of groups;

determining the number of times n that the digital image signals of the same image frame are to be read for image frames in each of the classified groups;

reading the digital image signals of the same image frame n times; and when n exceeds one. subjecting the digital image signals of the same image frame which have been read to averaging processing.

9. A method of noise reduction processing according to claim 8, wherein n is determined in such a manner as to become greater as the measured value of the large area transmission density becomes larger.

10. A method of noise reduction processing according to claim 8, wherein said method of noise reduction processing is used in the preparation of an index print for use as an index of the plurality of image frames recorded on the photographic film.

11. A method of noise reduction processing according to claim 8, wherein the averaging processing is effected by adding the digital image signals of the same image frame which have been read and then by dividing the added digital image signals by n.

12. A method of noise reduction processing according to claim 8, wherein each of the plurality of groups corresponds to a predetermined range of measured values of the large area transmission density.

13. A method of noise reduction processing according to claim 12, wherein the plurality of groups comprise: group A which includes image frames whose measured value of the large area transmission density is low or appropriate, group B which includes image frames whose measured value of the large area transmission density is higher than group A, and group C which includes image frames whose measured value of the large area transmission density is higher than group B.

14. A method of noise reduction processing according to claim 13, wherein n is 5 for image frames classified in group B.

15. A method of noise reduction processing according to claim 13, wherein n is 30 for image frames classified in group C.

16. A method of noise reduction processing for reducing noise generated when an image of a photographic film is converted to a digital image signal, comprising the steps of:

measuring a large area transmission density of each of a plurality of image frames recorded on the photographic film;

using measured values of the large area transmission density to classify each of the image frames into one of a plurality of groups each corresponding to a predetermined range of measured values of the large area transmission density;

reading the digital image signals of the same image frame n times, n being determined by the group into which said same image frame is classified; and when n exceeds one. subjecting the digital image signals of the same image frame which have been read to averaging processing by adding the digital image signals of the same image frame which have been read and then by dividing the added digital image signals by n.

17. A method of noise reduction processing according to claim 16, wherein said method of noise reduction processing is used in the preparation of an index print for use as an index of the plurality of image frames recorded on the photographic film.

18. A method of noise reduction processing according to claim 16, wherein the plurality of groups comprise: group A which includes image frames whose measured value of the large area transmission density is low or appropriate, group B which includes image frames whose measured value of the large area transmission density is higher than group A, and group C which includes image frames whose measured value of the large area transmission density is higher than group B.

19. A method of noise reduction processing according to claim 18, wherein n is 5 for image frames classified in group B.

20. A method of noise reduction processing according to claim 18, wherein n is 30 for image frames classified in group C.

21. A method of noise reduction processing for reducing noise generated when an image of a photographic film is converted to digital image signals, comprising the steps of:

measuring a large area transmission density of each of a plurality of image frames recorded on the photographic film;

reading the digital image signals of the same image frame n times, n being determined as a function of the measured value of the large area transmission density of said same image frame; and when n exceeds one, subjecting the digital image signals of said same image frame which have been read to averaging processing by adding together the digital image signals read from the n reading times and dividing the added digital image signals by n.

* * * * *